US011790592B2

(12) United States Patent
Hao et al.

(10) Patent No.: US 11,790,592 B2
(45) Date of Patent: Oct. 17, 2023

(54) DATA PROCESS APPARATUS FOR TO-BE-CACHED MATRIX AND METHOD THEREOF

(71) Applicant: Glenfly Tech Co., Ltd., Shanghai (CN)

(72) Inventors: Wenlin Hao, Shanghai (CN); Fengxia Wu, Shanghai (CN)

(73) Assignee: Glenfly Tech Co., Ltd., Shanghai (CN)

( * ) Notice: Subject to any disclaimer, the term of this patent is extended or adjusted under 35 U.S.C. 154(b) by 68 days.

(21) Appl. No.: 17/671,890

(22) Filed: Feb. 15, 2022

(65) Prior Publication Data

US 2023/0177761 A1    Jun. 8, 2023

(30) Foreign Application Priority Data

Dec. 2, 2021    (CN) .......................... 202111464745.X

(51) Int. Cl.
*G06T 15/00* (2011.01)
*G06T 1/60* (2006.01)
*G06T 1/20* (2006.01)

(52) U.S. Cl.
CPC .............. *G06T 15/005* (2013.01); *G06T 1/60* (2013.01); *G06T 1/20* (2013.01)

(58) Field of Classification Search
CPC ............ G06T 15/005; G06T 1/60; G06T 1/20
See application file for complete search history.

(56) References Cited

U.S. PATENT DOCUMENTS

2015/0054827 A1\*  2/2015  Hakura ..................... G06T 1/20
                                                        345/426
2019/0042245 A1\*  2/2019  Toll ..................... G06F 9/30036

FOREIGN PATENT DOCUMENTS

EP            2698707 A1 \*  2/2014  ............. G06F 8/443

\* cited by examiner

*Primary Examiner* — Said Broome
*Assistant Examiner* — Donna J. Ricks

(57) ABSTRACT

The present disclosure relates to a data process apparatus and a method thereof. The data process apparatus includes an internal memory unit and a shader level-1 cache. The internal memory unit is configured to store a to-be-cached matrix. The to-be-cached matrix includes at least a first element and a second element. The first element and the second element are stored in the internal memory unit in order of elements. The first element is located in a first row of the to-be-cached matrix, and the second element is located in next row of the to-be-cached matrix adjacent to the first row. The shader level-1 cache is connected to the internal memory unit, and configured to acquire the to-be-cached matrix to obtain a to-be-processed matrix stored in order of elements, and store the to-be-processed matrix. The data process apparatus can improve the efficiency of accessing the internal memory unit and reduce the bandwidth occupied by invalid data; enable hardware pipelines to be tighter and reduce idle clock cycles; and enable the shader level-1 cache to be smaller, thereby reducing hardware costs.

8 Claims, 4 Drawing Sheets

DATA PROCESS APPARATUS FOR TO-BE-CACHED MATRIX AND METHOD THEREOF

CROSS-REFERENCE TO RELATED APPLICATIONS

The present application claims priority to Chinese patent application No. 202111464745.X, entitled DATA PROCESS APPARATUS AND METHOD THEREOF, filed on Dec. 2, 2021, the specification of which is incorporated herein by reference in its entirety.

TECHNICAL FIELD

The present disclosure relates to the field of computer storage technologies, and in particular, to a data process apparatus and a method thereof.

BACKGROUND

A resource called a structured buffer may be used in graphics pipelines and computer pipelines. A shader may frequently read and write the structured buffer as an accessible resource.

Therefore, how to efficiently access the structured buffer is the key to the influence on the execution efficiency of the shader.

SUMMARY

Based on the above, there is a need to provide a data process apparatus and method, an electronic device and a computer-readable storage medium with respect to the above technical problems and/or other technical problems.

According to some embodiments, the present disclosure provides a data process apparatus, including an internal memory unit and a shader level-1 cache;

the internal memory unit being configured to store a to-be-cached matrix, the to-be-cached matrix including at least a first element and a second element, the first element and the second element being stored in the internal memory unit in order of elements; wherein the first element is located in a first row of the to-be-cached matrix, and the second element is located in next row of the to-be-cached matrix adjacent to the first row; and the shader level-1 cache being connected to the internal memory unit, and configured to acquire the to-be-cached matrix to obtain a to-be-processed matrix stored in order of elements, and store the to-be-processed matrix; wherein the first element is located in a first row of the to-be-processed matrix, and the second element is located in next row of the to-be-processed matrix adjacent to the first row.

In the data process apparatus according to the present disclosure, the to-be-cached matrix stored in the internal memory unit is stored in order of elements. That is, the first element is located in a first row of the to-be-cached matrix, and the second element is located in next row adjacent to the first row. In this way, when the shader level-1 cache acquires the to-be-cached matrix, selection of elements is not required, and required elements may be directly acquired from the shader level-1 cache to form the to-be-processed matrix, which improves the efficiency of accessing the internal memory unit and reduces a bandwidth footprint of invalid data. The improvement on the efficiency of accessing the internal memory unit enables hardware pipelines to be tighter and reduces idle clock cycles. Further, a space to be locked within a same clock cycle may be reduced for the shader level-1 cache. Therefore, the shader level-1 cache required by the data process apparatus according to the present disclosure may be smaller, thereby reducing hardware costs.

In one embodiment, the data process apparatus further includes a data process unit;

the data process unit being connected to the shader level-1 cache, and configured to perform data process on the to-be-processed matrix.

In one embodiment, the data process apparatus further includes a control logic unit;

the control logic unit being connected to the shader level-1 cache and the data process unit, and configured to perform a read operation and/or a write operation on the to-be-processed matrix.

In one embodiment, the data process apparatus further includes a virtual address calculation unit;

the virtual address calculation unit being connected to the internal memory unit and the shader level-1 cache, and configured to calculate a virtual address of the to-be-cached matrix, so that the shader level-1 cache acquires the to-be-cached matrix according to the virtual address.

In one embodiment, the to-be-cached matrix includes structured cached data.

Based on the same invention concept, the present disclosure further provides a data process method according to some embodiments, the data process method including:

acquiring a to-be-cached matrix, the to-be-cached matrix including at least a first element and a second element, the first element and the second element being stored in an internal memory unit in order of elements; wherein the first element is located in a first row of the to-be-cached matrix, and the second element is located in next row of the to-be-cached matrix adjacent to the first row; and obtaining a to-be-processed matrix stored in order of elements, and storing the to-be-processed matrix;

the step of rearranging elements in the to-be-cached matrix to obtain the to-be-processed matrix stored in order of elements including:

acquiring and storing the first element; and
acquiring and storing the second element.

In the data process method according to the present disclosure, the to-be-cached matrix stored in the internal memory unit is stored in order of elements. That is, the first element is located in a first row of the to-be-cached matrix, and the second element is located in next row adjacent to the first row. In this way, when the to-be-cached matrix is acquired, the to-be-processed matrix may be formed without selection of elements, which improves the efficiency of accessing the internal memory unit and reduces a bandwidth footprint of invalid data. The improvement on the efficiency of accessing the internal memory unit enables hardware pipelines to be tighter and reduces idle clock cycles. Further, a space to be locked within a same clock cycle may be reduced for the shader level-1 cache. Therefore, the shader level-1 cache required by the data process method according to the present disclosure may be smaller, thereby reducing hardware costs.

In one embodiment, after the step of obtaining a to-be-processed matrix, the data process method further includes:

performing data process on the to-be-processed matrix.

In one embodiment, the step of performing data process on the to-be-processed matrix includes:

acquiring a control logic; and
performing a read operation and/or a write operation on the to-be-processed matrix based on the control logic.

In one embodiment, the data process method further includes:

calculating a virtual address of the to-be-cached matrix stored in the internal memory unit; and the step of performing a read operation and/or a write operation on the to-be-processed matrix based on the control logic includes:

acquiring the to-be-cached matrix according to the virtual address based on the control logic.

In one embodiment, the to-be-cached matrix includes structured cached data.

BRIEF DESCRIPTION OF THE DRAWINGS

For a more complete understanding, reference is now made to the following description taken in conjunction with the accompanying Drawings in which.

REFERENCE NUMERALS

Figure 1:
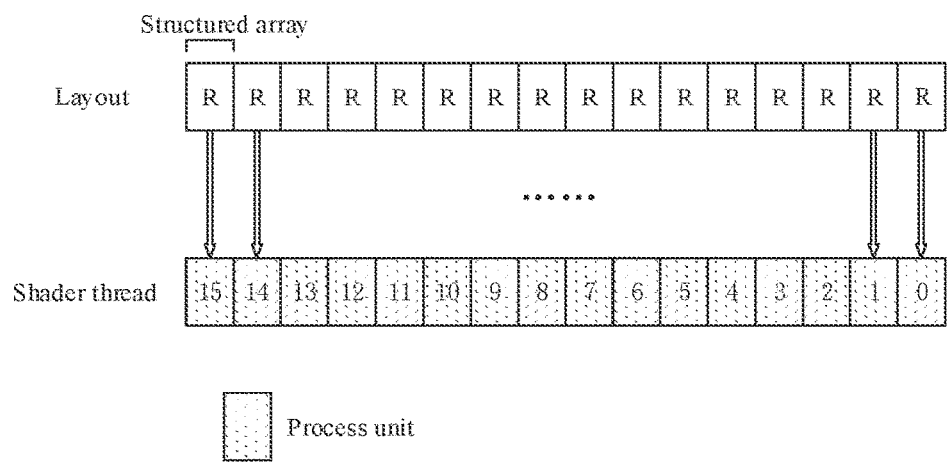
FIG. 1 is a schematic diagram of a memory layout of a to-be-cached data matrix in a structured buffer and a read/write relationship of a corresponding shader thread.

10: internal memory unit; 20: shader level-1 cache; 30: data processing unit; 40: control logic unit; 50: virtual address calculation unit; 60: engine.

DETAILED DESCRIPTION

In order to make the objectives, technical solutions and advantages of the present disclosure more comprehensible, the present disclosure is described in further detail below with reference to the accompanying drawings and embodiments. It should be understood that specific embodiments described herein are intended only to interpret the present disclosure and not intended to limit the present disclosure.

A resource called a structured buffer may be used in graphics pipelines and computer pipelines. A structured buffer may generally correspond to a contiguous memory block on memory. Different from a normal buffer resource, a structured buffer resource has a stride, so it represents a structured array. In other words, the structured buffer is a buffer including elements of an equal size. Elements are defined using structures with one or more member types. A shader may frequently read and write the structured buffer as an accessible resource.

Taking a structure with three member types as an example,

```
struct MyStruct
{
float4 Color;
float4 Normal;
bool isAwesome;
};
```

In this case, a structured buffer as shown below may be declared using the above structure:

StructuredBuffer<MyStruct>mySB;

Individual members of a structured buffer may also be accessed using indexes and references, as shown below:

float4myColor=mySb[27].Color;

On this basis, the shader should have three instructions that support the structured buffer, as shown below:

dcl_uav_structured dstUAV, structByteStride ld_structured dst0, srcAddress, srcByteOffset, srcUAV.[mask]

store structured dstUAV. [mask], dstAddress, dstByteOffset, src0.

In the above instructions, the first one is to declare a structured buffer, and "structByteStride" is a stride of the structured buffer. The second one is a read instruction, which may read 1 to 4 elements of 32 bits from a designated structured buffer. "srcAddress" is an index of the structured buffer, "srcByteOffset" is an internal offset of the structure, and "[mask]" may be x, xy, xyz, or xyzw, indicating which elements are read. The third one is a write instruction, which writes 1 to 4 elements of 32 bits to a structured buffer. "dstAddress" is an index of the structured buffer, "dstByteOffset" is an internal offset of the structure, and "[mask]" may be x, xy, xyz, or xyzw, indicating a number of elements written to memory.

Generally, in order to improve performance, the shader adopts an idea of data parallelism, that is, single-instruction multi-data. Therefore, how to efficiently access the structured buffer is the key to the influence on the execution efficiency of the shader.

Those skilled in the art should be aware that many application scenarios require the capability to read or write data from or into structured buffers with indexes and references, while reading from and writing to memory is typically performed for a contiguous space.

Taking a shader thread including 16 process units as an example below, assuming that one shader thread may simultaneously process 16 pieces of data, that is, include 16 process units, when only one element exists in a structured array, a memory layout of a to-be-cached data matrix in the structured buffer and a read/write relationship of a corresponding shader thread may be shown in FIG. 1.

As shown in FIG. 1, a shader thread may simultaneously process 16 pieces of data, that is, include 16 process units. A structured array has only one element R. Each process unit reads and writes 4 bytes. Then, the shader may not waste bandwidth when accessing the structured buffer, and can read and write 16 consecutive 32 bits, i.e., consecutive 512 bits. In this case, all data is valid.

Figure 2:
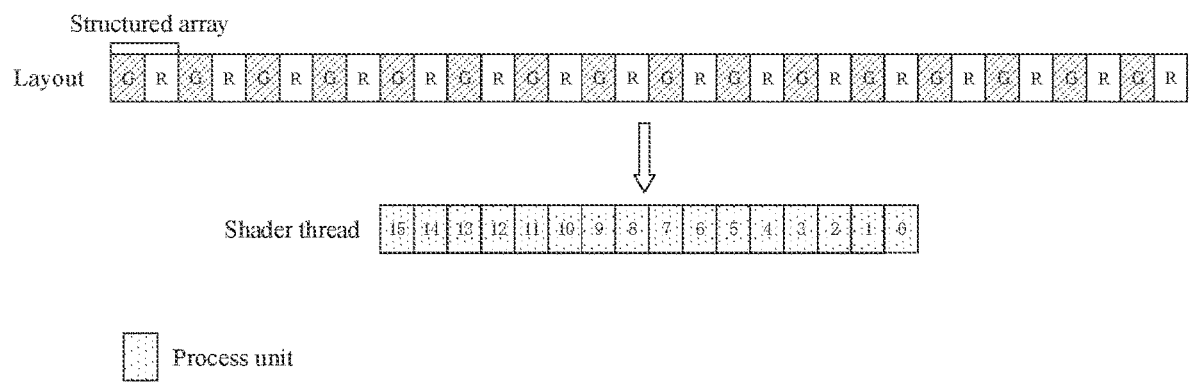
FIG. 2 is a schematic diagram of a memory layout of another to-be-cached data matrix in a structured buffer and a read/write relationship of a corresponding shader thread.

However, when the structured array widens, a memory layout of a to-be-cached data matrix in a structured buffer and a thread read/write relationship of a corresponding shader may be shown in FIG. 2.

As shown in FIG. 2, a structured array includes two elements R and G. It is assumed that the shader is still a thread and may simultaneously process 16 pieces of data, that is, include 16 process units, and each process unit reads and writes 4 bytes. The shader typically operates in a single-instruction multi-data parallel mode. In this case, when accessing the structured buffer to process the R element, the shader is required to interact with data of 1024 bits, half of which is invalid.

As can be seen, when the structured array widens and includes more elements, more invalid data is read and written. Moreover, the control logic is also more complex when the elements that are actually used from a structured array. Based on the conventional data layout manner, the efficiency of accessing the structured buffer is very low, and invalid data occupies the bandwidth, which may affect the performance of the whole hardware.

Figure 3:
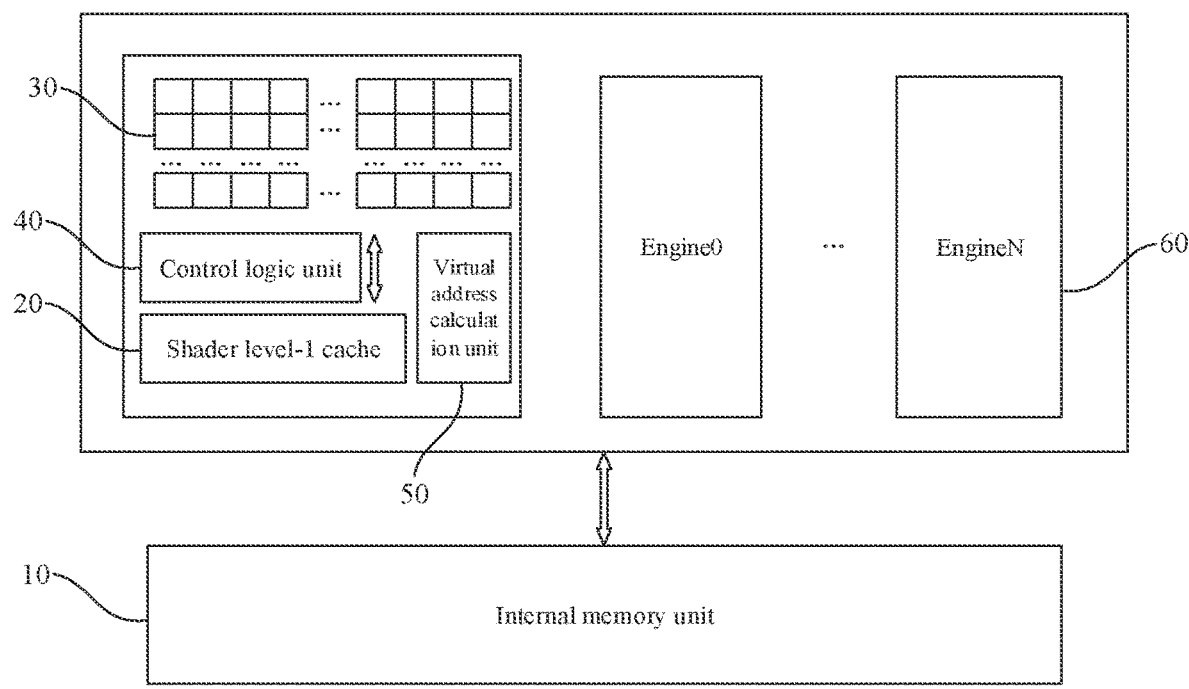
FIG. 3 is a schematic structural diagram of a data process apparatus according to an embodiment of the present disclosure.

In view of the above problem, the present disclosure provides a data process apparatus according to some embodiments. Referring to FIG. 3, the data process apparatus may include an internal memory unit 10 and a shader level-1 cache 20.

Specifically, the internal memory unit 10 is configured to store a to-be-cached matrix. The to-be-cached matrix may include at least a first element and a second element, and the first element and the second element are stored in the internal memory unit 10 in order of elements. The first element is located in a first row of the to-be-cached matrix, and the second element is located in next row of the to-be-cached matrix adjacent to the first row. The shader level-1 cache 20 is connected to the internal memory unit 10, and configured to acquire the to-be-cached matrix to obtain a to-be-processed matrix stored in order of elements, and store the to-be-processed matrix. The first element is located in a first row of the to-be-processed matrix, and the second element is located in next row of the to-be-processed matrix adjacent to the first row.

In the data process apparatus according to the present disclosure, the to-be-cached matrix stored in the internal memory unit is stored in order of elements. That is, the first element is located in a first row of the to-be-cached matrix, and the second element is located in next row adjacent to the first row. In this way, when the shader level-1 cache acquires the to-be-cached matrix, selection of elements is not required, and required elements may be directly acquired from the shader level-1 cache to form the to-be-processed matrix, which improves the efficiency of accessing the internal memory unit and reduces a bandwidth footprint of invalid data. The improvement on the efficiency of accessing the internal memory unit enables hardware pipelines to be tighter and reduces idle clock cycles. Further, a space to be locked within a same clock cycle may be reduced for the shader level-1 cache. Therefore, the shader level-1 cache required by the data process apparatus according to the present disclosure may be smaller, thereby reducing hardware costs.

It may be understood that the first element and the second element involved in the present disclosure may be same or different elements, which is not limited in the present disclosure. A data form of the to-be-cached matrix is not specifically limited in the present disclosure. The data form of the to-be-cached matrix may include, but is not limited to, structured cached data.

The shader level-1 cache 20 may be a shader-serving cache that can be configured to hide latency in data process and can also be configured to store various types of data, such as structured cached data.

Still referring to FIG. 3, in one embodiment, the data process apparatus may further include a data process unit 30. The data process unit 30 is connected to the shader level-1 cache 20 and is configured to perform data process on the to-be-processed matrix.

The form in which the data process unit 30 performs data process on the to-be-processed matrix is not specifically limited in the present disclosure. It may be understood that the data process unit 30 may perform data process, which includes, but is not limited to, addition, shift or multiplication, on the to-be-processed matrix.

Figure 4:
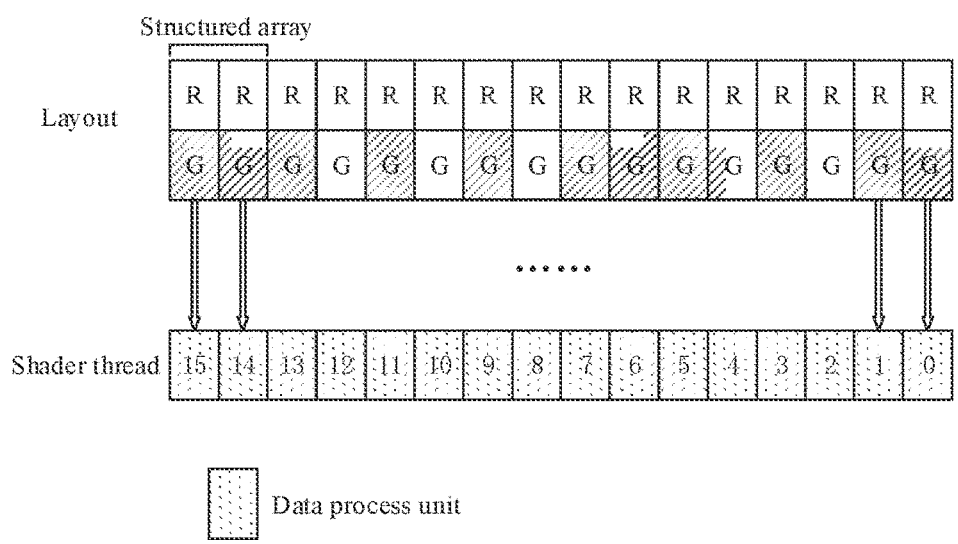
FIG. 4 is a schematic diagram of a memory layout of a to-be-processed matrix in a shader level-1 cache and a read/write relationship of a corresponding data process unit in a data process apparatus according to an embodiment of the present disclosure.

The following is an example of a shader in which each shader thread includes 16 data processing units 30. As shown in FIG. 4, when a structured array of the shader level-1 cache 20 accessed by the shader includes two elements (G and R), a memory layout of the to-be-processed matrix in the shader level-1 cache 20 and a read/write relationship of the corresponding data process unit 30 may be shown in FIG. 4.

In the data process apparatus according to the above embodiment, 16 G elements or 16 R elements can be acquired in one clock cycle, and a shader pipeline can begin. That is, the shader can access the shader level-1 cache more efficiently, enabling the shader pipeline to be tighter and reducing idle clock cycles. At the same time, in the data process apparatus according to the above embodiment, two shader threads may include 32 data process units 30. The first shader thread includes 16 data process units 30, and the second shader thread includes 16 data process units 30. In one example, while the first shader thread processes the 16 R elements, the second shader thread processes the 16 G elements. That is, as long as the data is ready, the two shader threads can operate in parallel, which improves the performance of the data process apparatus by data parallelism.

Still taking the shader thread including 16 data process units 30 as an example, comparing FIG. 2 with FIG. 4, for the same shader level-1 cache 20 storing two elements, if the data is stored in the shader level-1 cache 20 according to the memory layout shown in FIG. 2 in the conventional art, when an instruction requires reading two elements (mask=xy), the shader is required to read back 16 pairs of RG from the internal memory unit 10. Since the first thread shader only processes R, in order to avoid losing G elements, the shader is required to store all 16 pairs of RG in the shader level-1 cache 20. In this way, when the second shader thread processes G, the G elements in the shader level-1 cache 20 may be used directly without sending a read request to the internal memory unit 10. Similarly, for a write request, in order to keep the write operation continuous as far as possible and reduce the number of write operations, the shader level-1 cache 20 is also needed to piece together 16 pairs of RG and write them into the internal memory unit 10 at one time; otherwise, first 16 R elements and then 16 G elements are required to be written in a jump manner.

In the data process apparatus according to some possible embodiments of the present disclosure, as shown in FIG. 4, same elements in a structure array are arranged together, and all data for the same elements is arranged prior to arrangement of the next element. In this way, the shader is required to read/write data of 512 bits only regardless of reading/writing the R elements or the G elements. That is, the space required by the shader level-1 cache 20 may be appropriately reduced, thereby reducing hardware costs.

It is to be noted that how much the shader level-1 cache 20 required by the data process apparatus can be reduced depends on a specific application scenario of the data process apparatus. Those skilled in the art may comprehensively consider all application scenarios and finally determine a size of the shader level-1 cache 20.

In one embodiment, each thread of the shader has n process units in the hardware design. The most common shader level-1 cache 20 in practical application scenarios includes m elements, each of which occupies 4 bytes. Then, those skilled in the art may consider reducing the size of the shader level-1 cache 20 to 4*(m−1)*n bytes.

Certainly, the formula cannot be applied completely by those skilled in the art, because part of the function of the shader level-1 cache 20 of the shader is to help hide latency in execution of the shader. When all the data process units 30 of the shader operate, data returned to the shader by the internal memory unit 10 cannot start performing an operation immediately. In this case, in order to prevent congestion of a data bus, the data returned to the shader by the internal memory unit 10 is required to be stored in the shader level-1 cache 20. Therefore, in the data process apparatus according to the above embodiment, the shader level-1 cache 20 of the shader may be reduced, but the specific reduction depends on hardware characteristics and application scenarios.

Still referring to FIG. 3, in one embodiment, the data process apparatus may further include a control logic unit 40. The control logic unit 40 is connected to the shader level-1 cache 20 and the data process unit 30, and configured to control the data process unit 30 to perform a read operation and/or a write operation on the to-be-processed matrix.

Specifically, the control logic unit 40 may be configured to pick out same elements of a plurality of structured arrays from the shader level-1 cache 20 for processing. That is, the to-be-processed matrix may be read from the shader level-1 cache 20 to the data process unit 30 through the control logic unit 40. Similarly, a process result may also be written from the data process unit 30 to the shader level-1 cache 20 through the control logic unit 40.

In the data process apparatus according to this embodiment, the control logic unit is not required to perform a read operation and/or a write operation on the to-be-processed matrix in a jump manner. That is, selection of elements is not required. No matter how many elements are included in a structured array, the control logic unit does not require the selection of elements. Therefore, the control logic unit can be simplified, thereby effectively reducing hardware costs.

Still referring to FIG. 3, in one embodiment, the data process apparatus may further include a virtual address calculation unit 50. The virtual address calculation unit 50 is connected to the internal memory unit 10 and the shader level-1 cache 20, and configured to calculate a virtual address of the to-be-cached matrix, so that the shader level-1 cache 20 can acquire the to-be-cached matrix according to the virtual address.

Specifically, the virtual address involved in the present disclosure refers to a virtual address of the to-be-cached matrix in the internal memory unit 10. That is, the virtual address calculation unit 50 may be configured to calculate the virtual address corresponding to the to-be-cached matrix in the internal memory unit 10. The shader may acquire the to-be-cached matrix according to the virtual address, which is stored in the shader level-1 cache 20 as the to-be-processed matrix.

It may be understood that the specific manner of calculating the virtual address by the virtual address calculation unit 50 is not limited in the present disclosure. In one embodiment, the virtual address calculation unit 50 may calculate the virtual address based on the following formulas:

"$X\_id$=Base+Offset";

"Offset="("struct$\_id$>>5")"*32*stride+"(("byte_offset_in_struct>>2")"*32+struct$\_id$&0×1$f$")"*4";

where Base denotes a start address of a current resource; struct_id denotes an index; stride denotes a size of a structured array, also referred to as step; and byte_offset_in_struct denotes an offset that refers to the interior of the structured array.

On the basis of the above embodiment, in a case where access to multiple elements is required, virtual addresses of other elements may be obtained by an address of an element X plus a fixed offset.

Channel_offset=(32*32 bit/channel)>>3=128 byte;

$Y\_VA = X\_VA$+channel_offset;

$Z\_VA = Y\_VA$+channel_offset;

$W\_VA = Z\_VA$+channel_offset.

A more general data process apparatus is described below in combination with the bandwidth of the internal memory unit 10 and an execution mode of the shader.

Figure 5:
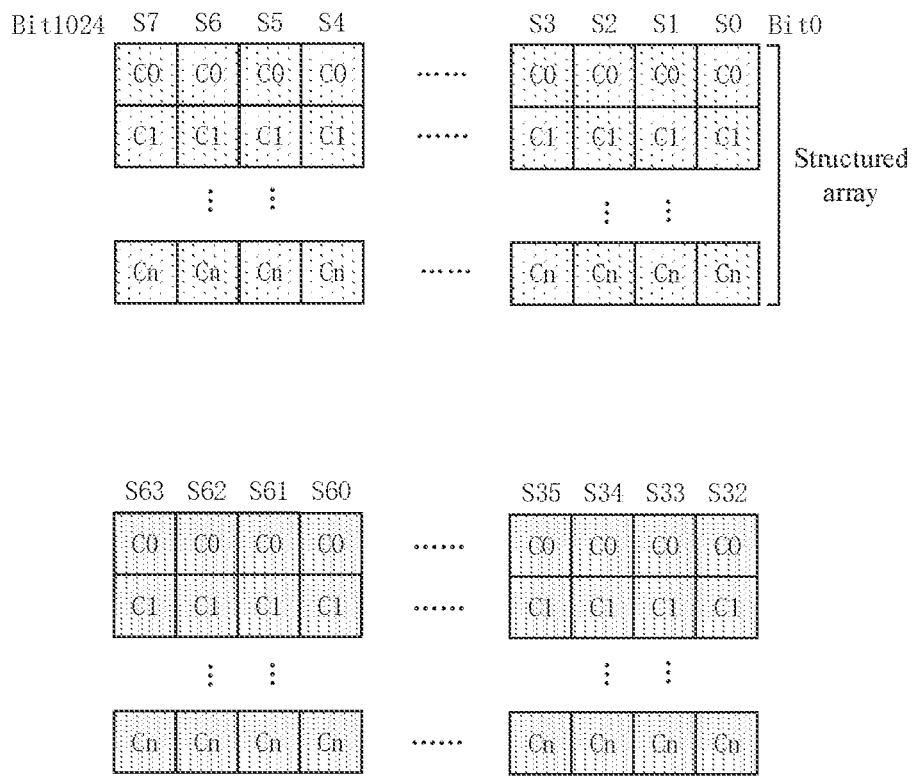
FIG. 5 is a schematic diagram of a memory layout of a to-be-processed matrix in a shader level-1 cache in a data process apparatus according to another embodiment of the present disclosure.

In one embodiment, as shown in FIG. 5, for a structure array including n+1 elements each of which occupies 4 bytes, the data process apparatus according to this embodiment can put together same elements of 32 structured arrays (S0 to S31) and put another element until the first 32 structured arrays are completely put. Then, the following 32 structured arrays are stored in the same manner, and so on.

All the elements in each structured array in the data process apparatus according to this embodiment are no longer contiguous in the address space, but the same elements of 32 structured arrays are contiguous in the address space, which can well fit with a shader including a shader thread with 32 data process units 30.

It may be understood that the specific size of the shader thread is not limited in the present disclosure. In other embodiments, a shader thread may also include 64, 128 or more data process units 30.

The number of the data process unit 30 is not limited in the present disclosure. For example, if the bandwidth of the internal memory unit 10 is 1024 bits, one element of 32 structured arrays may be acquired in each read/write operation. In this case, if the shader thread has 32 data process units 30, limited by the bandwidth, even if same elements of 64 structured arrays are put together, the read/write operation is still required to be performed twice, and two clock cycles are required. Here, those skilled in the art may have the option of putting the same elements of the 32 structured arrays together.

It may be understood that, in the hardware design, the memory layout may be selected adaptively according to specific application scenarios of the data process apparatus. That is, all application scenarios may be comprehensively considered to finally determine the number of structured arrays of which same elements are grouped together, so as to achieve optimal access efficiency.

Still referring to FIG. 3, in one embodiment, the data process apparatus may further include a plurality of engines 60 (such as Engine® to EngineN shown in FIG. 3). The engine 60 is connected to the internal memory unit 10, and the internal memory unit 10 may serve the plurality of engines 60. Since the improvement on the efficiency of accessing the shader level-1 cache reduces a bandwidth footprint of invalid data, the internal memory unit 10 can also better serve the engines 60.

Those skilled in the art may understand that, in the structure shown in FIG. 3, only a block diagram of a partial structure related to the solution of the present disclosure is shown, which does not constitute a limitation on the data process apparatus to which the solution of the present disclosure is applied. Specifically, the data process apparatus may include more or fewer structures than those shown in the figure, or combine some structures, or have different structural arrangements.

Figure 6:
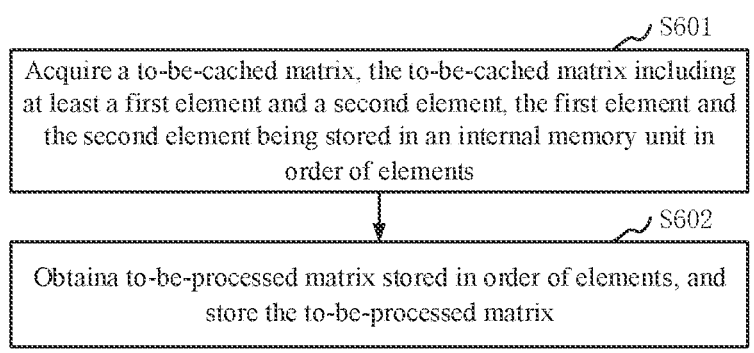
FIG. 6 is a flowchart of a data process method according to an embodiment of the present disclosure.

Based on the same invention concept, the present disclosure further provides a data process method according to some embodiments. Referring to FIG. 6, the data process method may include the following steps.

In S601, a to-be-cached matrix is acquired. Specifically, the to-be-cached matrix includes at least a first element and a second element, and the first element and the second element are stored in an internal memory unit in order of elements.

In S602, a to-be-processed matrix stored in order of elements is obtained and stored.

It may be understood that the to-be-cached matrix stored in order of elements may refer to the following layout: the first element is located in a first row of the to-be-cached matrix, and the second element is located in next row of the to-be-cached matrix adjacent to the first row. For example, in one embodiment, the to-be-cached matrix stored in order of elements may be shown in FIG. 4.

For step S602, in one embodiment, step S602 may include a step of acquiring and storing the first element; and a step of acquiring and storing the second element.

In the data process method according to the present disclosure, the to-be-cached matrix stored in the internal memory unit is stored in order of elements. That is, the first element is located in a first row of the to-be-cached matrix, and the second element is located in next row adjacent to the first row. In this way, when the to-be-cached matrix is acquired, the to-be-processed matrix may be formed without selection of elements, which improves the efficiency of accessing the internal memory unit and reduces the bandwidth occupied by invalid data. The improvement on the efficiency of accessing the internal memory unit enables hardware pipelines to be tighter and reduces idle clock cycles. Further, a space to be locked within a same clock cycle may be reduced for the shader level-1 cache. Therefore, the shader level-1 cache required by the data process method according to the present disclosure may be smaller, thereby reducing hardware costs.

It is to be noted that the data process method according to the present disclosure may be applied to the data process apparatus according to any one of the above embodiments. Therefore, the technical effects that can be achieved by the data process apparatus can also be achieved by the data process method, which are not described in detail herein.

Figure 7:
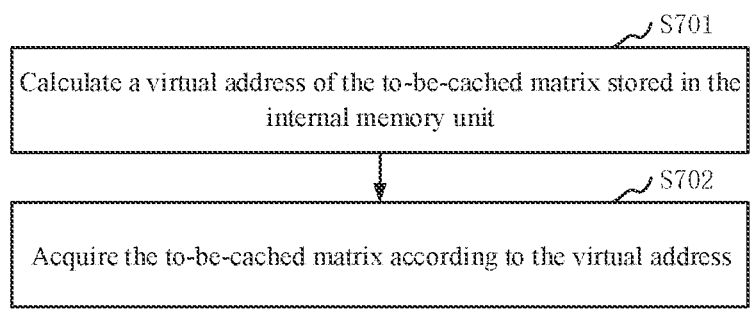
FIG. 7 is a flowchart of step S601 in a data process method according to an embodiment of the present disclosure.

For step S601, refer to FIG. 7 in combination with S601 in FIG. 6. In one embodiment, step S601 may specifically include the following steps.

In S701, a virtual address of the to-be-cached matrix stored in the internal memory unit is calculated.

In S702, the to-be-cached matrix is acquired according to the virtual address.

In one embodiment, after step S602, the data process method may further include a step of performing data process on the to-be-processed matrix.

Figure 8:
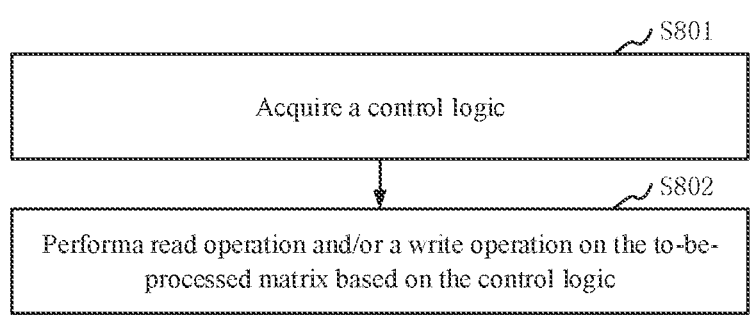
FIG. 8 is a flowchart of a step of performing data process on a to-be-processed matrix in a data process method according to an embodiment of the present disclosure.

In one embodiment, as shown in FIG. 8, the step of performing data process on the to-be-processed matrix may specifically include the following steps.

In S801, a control logic is acquired.

In S802, a read operation and/or a write operation are/is performed on the to-be-processed matrix based on the control logic.

It should be understood that, although the steps in the flowcharts of FIG. 6 to FIG. 8 are displayed in sequence as indicated by the arrows, the steps are not necessarily performed in the order indicated by the arrows. Unless otherwise clearly specified herein, the steps are performed without any strict sequence limitation, and may be performed in other orders. In addition, at least some steps in FIG. 6 to FIG. 8 may include a plurality of steps or a plurality of stages, and such steps or stages are not necessarily performed at a same moment, and may be performed at different moments. The steps or stages are not necessarily performed in sequence, and the steps or stages and at least some of other steps or steps or stages of other steps may be performed in turn or alternately.

Based on the same invention concept, the present disclosure further provides an electronic device according to some embodiments. The electronic device may include a processor and a memory. One or more computer programs are stored in the memory and configured to be executable by the processor, so as to perform the data process method according to any one of the above embodiments.

It is to be noted that the electronic device may be a terminal. The electronic device may include a processor, a memory, a communication interface, a display screen, and/or an input apparatus that are connected by using a system bus. The processor of the electronic device may be configured to provide computing and control capabilities. The memory of the electronic device may include, but is not limited to, a non-transitory storage medium and an internal memory. The non-transitory storage medium may store an operating system and a computer program. The internal memory may provide an environment for running of the operating system and the computer program in the non-transitory storage medium. The communication interface of the electronic device is configured to communicate with an external terminal in a wired or wireless manner. The wireless manner may be realized through WIFI, a carrier network, near field communication (NFC), or other technologies. The computer program is executed by the processor to perform steps of the data process method according to any one of the above embodiments.

Based on the same invention concept, the present disclosure further provides a non-transitory computer-readable storage medium according to some embodiments. The computer-readable storage medium stores program codes. When the program codes are executed by a processor, the data process method according to any one of the above embodiments can be performed.

Those of ordinary skill in the art may understand that some or all procedures in the data process methods according to the above embodiments may be implemented by a computer program instructing related hardware. The computer program may be stored in a non-transitory computer-readable storage medium, and when the computer program is executed, the procedures in any one of the embodiments of the data process method may be implemented. Any reference to a memory, a storage, a database, or other media used in the embodiments provided in the present disclosure may include at least one of a non-transitory memory and a transitory memory. The non-transitory memory may include a read-only memory (ROM), a magnetic tape, a floppy disk, a flash memory, an optical memory, or the like. The transitory memory may include a random access memory (RAM) or an external high-speed cache memory. By way of illustration and not limitation, the RAM is available in a variety of forms, such as a static RAM (SRAM), a dynamic RAM (DRAM), or the like.

The technical features in the above embodiments may be randomly combined. For concise description, not all possible combinations of the technical features in the above embodiments are described. However, all the combinations of the technical features are to be considered as falling within the scope described in this specification provided that they do not conflict with each other.

The above embodiments only describe several implementations of the present disclosure, and their description is specific and detailed, but cannot therefore be understood as a limitation on the patent scope of the invention. It should be noted that those of ordinary skill in the art may further make variations and improvements without departing from the conception of the present disclosure, and these all fall within the protection scope of the present disclosure. Therefore, the patent protection scope of the present disclosure should be subject to the appended claims.

What is claimed is:

1. A data process apparatus, comprising an internal memory unit and a shader level-1 cache;
    the internal memory unit being configured to store a to-be-cached matrix, the to-be-cached matrix comprising at least a first element and a second element, the first element and the second element being stored in the internal memory unit in order of elements; wherein
    the first element is located in a first row of the to-be-cached matrix, and the second element is located in next row of the to-be-cached matrix adjacent to the first row;
    the shader level-1 cache being connected to the internal memory unit, and configured to acquire the to-be-cached matrix to obtain a to-be-processed matrix stored in order of elements, and store the to-be-processed matrix; wherein
    the first element is located in a first row of the to-be-processed matrix, and the second element is located in next row of the to-be-processed matrix adjacent to the first row;
        the data process apparatus further comprising a virtual address calculation processor; the virtual address calculation processor being connected to the internal memory unit and the shader level-1 cache, and configured to calculate a virtual address of the to-be-cached matrix, so that the shader level-1 cache acquires the to-be-cached matrix according to the virtual address.

2. The data process apparatus according to claim 1, further comprising a data processor;
    the data processor being connected to the shader level-1 cache, and configured to perform data process on the to-be-processed matrix.

3. The data process apparatus according to claim 2, further comprising a control logic;
    the control logic being connected to the shader level-1 cache and the data processor and configured to perform a read operation and/or a write operation on the to-be-processed matrix.

4. The data process apparatus according to claim 1, wherein the to-be-cached matrix comprises structured cached data.

5. A data process method, comprising:
    acquiring a to-be-cached matrix, the to-be-cached matrix comprising at least a first element and a second element, the first element and the second element being stored in an internal memory unit in order of elements; wherein
    the first element is located in a first row of the to-be-cached matrix, and the second element is located in next row of the to-be-cached matrix adjacent to the first row; and
    obtaining a to-be-processed matrix stored in order of elements, and storing the to-be-processed matrix;
    the step of obtaining a to-be-processed matrix stored in order of elements comprising:
        acquiring and storing the first element; and
        acquiring and storing the second element,
    the step of acquiring a to-be-cached matrix comprises:
        calculating a virtual address of the to-be-cached matrix stored in the internal memory unit; and
        acquiring the to-be-cached matrix according to the virtual address.

6. The data process method according to claim 5, further comprising: after the step of obtaining a to-be-processed matrix,
    performing data process on the to-be-processed matrix.

7. The data process method according to claim 6, wherein the step of performing data process on the to-be-processed matrix comprises:
    acquiring a control logic; and
    performing a read operation and/or a write operation on the to-be-processed matrix based on the control logic.

8. The data process method according to claim 5, wherein the to-be-cached matrix comprises structured cached data.

* * * * *